United States Patent [19]

Luebbering et al.

[11] Patent Number: 4,972,332

[45] Date of Patent: Nov. 20, 1990

[54] APPARATUS FOR DETERMINING THE SPEED, ANGULAR POSITION AND DIRECTION OF ROTATION OF A ROTATABLE SHAFT

[75] Inventors: Bernard L. Luebbering; Wayne D. Brandt, both of Morton, Ill.

[73] Assignee: Caterpillar Inc., Peoria, Ill.

[21] Appl. No.: 308,909

[22] PCT Filed: Dec. 9, 1988

[86] PCT No.: PCT/US88/04357

§ 371 Date: Dec. 27, 1988

§ 102(e) Date: Dec. 27, 1988

[87] PCT Pub. No.: WO90/06517

PCT Pub. Date: Jun. 14, 1990

Related U.S. Application Data

[63] Continuation-in-part of Ser. No. 78,728, Jul. 28, 1987.

[51] Int. Cl.$^5$ .......................... G01P 3/48; G06F 15/20
[52] U.S. Cl. ........................... 364/565; 364/566;
364/556; 324/169; 324/178; 340/672; 73/505;
73/488
[58] Field of Search ............... 364/565, 566, 556, 559;
340/670–672; 324/169, 178; 73/505, 510, 509, 488

[56] References Cited

U.S. PATENT DOCUMENTS

| | | | |
|---|---|---|---|
| 3,916,863 | 11/1975 | Hohne et al. | 123/148 |
| 4,050,747 | 9/1977 | Ruhnau et al. | 303/95 |
| 4,199,719 | 4/1980 | Grob | 324/166 |
| 4,355,364 | 10/1982 | Gudat | 364/565 |
| 4,356,447 | 10/1982 | Hönig et al. | 324/169 |
| 4,358,828 | 11/1982 | Reid et al. | 364/565 |
| 4,426,974 | 1/1984 | Nash | 123/418 |
| 4,434,470 | 2/1984 | Thomas et al. | 364/565 |
| 4,485,452 | 11/1984 | Cording et al. | 364/565 |
| 4,506,339 | 3/1985 | Kühnlein | 364/565 |
| 4,519,362 | 5/1985 | Arakawa et al. | 123/414 |
| 4,529,934 | 7/1985 | Heinrich | 324/173 |
| 4,535,288 | 8/1985 | Vitulli, Jr. | 324/161 |
| 4,581,713 | 4/1986 | Fennel | 364/571 |
| 4,715,009 | 12/1987 | Böhmler et al. | 364/565 |
| 4,746,862 | 5/1988 | Ueki | 324/208 |
| 4,783,627 | 11/1988 | Pagei et al. | 324/208 |

FOREIGN PATENT DOCUMENTS

| | | |
|---|---|---|
| 2209935 | 7/1974 | France . |
| 2495327 | 4/1982 | France . |
| 1362740 | 8/1974 | United Kingdom . |
| 2058358 | 4/1981 | United Kingdom . |
| 2145527A | 3/1985 | United Kingdom . |
| 2170009 | 7/1986 | United Kingdom . |
| 8600415 | 1/1986 | World Int. Prop. O. . |

*Primary Examiner*—Parshotam S. Lall
*Assistant Examiner*—Brian M. Mattson
*Attorney, Agent, or Firm*—Marshall, O'Toole, Gerstein, Murray & Bicknell

[57] ABSTRACT

An apparatus (10) for use on electronically controlled fuel injection systems senses speed, angular position, and direction of rotation using only a single Hall effect type sensor (24). A disk element (14) is fixedly connected to and rotatable with the camshaft of an internal combustion engine. The disk element (14) includes a plurality of circumferential zones (16a–16x) of substantially identical length with each zone (16a–16x) having first (18a–18x) and second (20a–20x) areas. A first portion 16c–16t, 16v–16x) of these circumferential zones (16a–16x) have first (18c–18t, 18v–18x) and second areas (20c–20t, 20v–20x) which are substantially different in length than the first (18a, 18b, 18u) and second areas (20a, 20b, 20u) of a second portion (16a, 16b, 16u) of the circumferential zones (16a–16x). Accordingly, the sensor (24) delivers a signal which has a frequency directly related to the instantaneous velocity of the disk element (14), but varies in pulse width in response to the first (16c–16t, 16v–16x) and second (16a, 16b, 16u) portions of the circumferential zones (16a–16x). A microprocessor (46) operating under software control detects the instantaneous angular position and direction of rotation of the disk element (14) by locating the second portion (16a, 16b, 16u) of the circumferential zones (16a–16x) and the order in which they are received.

17 Claims, 4 Drawing Sheets

APPARATUS FOR DETERMINING THE SPEED, ANGULAR POSITION AND DIRECTION OF ROTATION OF A ROTATABLE SHAFT

CROSS REFERENCE TO RELATED APPLICATION

The present application comprises a continuation-in-part of application Ser. No. 078,728, filed July 28, 1987 now abandoned in the name of Luebbering et al. and assigned to the assignee of the present application.

DESCRIPTION

1. Technical Field

The present invention relates generally to an apparatus for determining the speed, angular position and direction of rotation of a rotatable shaft and more particularly to a camshaft of an internal combustion engine.

2. Background Art

In the field of internal combustion engine controls, it is a well recognized principal that accurate fuel injection timing is necessary to maintain stable and efficient engine operation. The timing of an internal combustion engine is highly dependent upon both the speed of rotation and the angular position of the engine at any instant in time. It is therefore necessary to determined both the crankshaft angle and rotational speed to a high degree of accuracy. Preferably, a single sensing element could be used for detecting both parameters. For example, U.S. Pat. No. 4,356,447 issued to Honig et al. on Oct. 26, 1982 discloses a single inductive type sensor and awn associated specially constructed disk for sensing both timing angle and speed of rotation. The disk includes a group of markers uniformly distributed about the periphery of the disk and an additional reference marker distinguishable from the remaining markers and associated with a particular angle of rotation. Thus, by introducing some electronic complexity, Honig et al. determine rotational speed from the first group of markers while ignoring the presence of the reference marker. Additional circuitry utilizes the reference marker as an indication of angular position with the subsequent regularly recurring markers being used to subdivide the angular rotation. The use of the reference marker at a location aperiodic with the angular locations of the regularly recurring markers unnecessarily complicates the scheme for determining speed and angle of rotation.

Moreover, in internal combustion engines of the compression ignition type, it is possible for an external load to drive the engine in the opposite rotational direction. Operation of the engine in such a manner will lead to serious mechanical damage and resultant engine failure. It is desirable that a single system be capable of sensing not only rotational speed and angular displacement but also direction of rotation. By combining all three functions into a single system with a single Hall effect type speed sensor, an increase in system reliability can be expected due to the elimination of additional speed sensors and the high reliability of the rotating mechanical disk. Additionally, cost savings can be expected owing to the reduced number of sensors.

The present invention is directed to overcoming one or more of the problems as set forth above.

DISCLOSURE OF THE INVENTION

In accordance with one aspect of the present invention, an apparatus determines the speed, angular position and direction of rotation of the rotatable shaft. The apparatus includes a disk element rotatable in synchronization with the rotatable shaft and having a plurality of contiguous circumferential zones of equal circumferential distance. Each of the zones has a first area positioned at a first preselected radial distance from the center of the disk and a second area positioned at a second preselected radial distance from the center of the disk different from the first radial distance. A first portion of the contiguous circumferential zones has first areas of equivalent circumferential distance. A second portion of the contiguous circumferential zones has first areas of equivalent circumferential distance different from the first portion, first area circumferential distance. A fixed sensor is disposed at a preselected radial distance from the center of the disk in sensing relation to the circumferential zones wherein the sensor is adapted for delivering a series of signals responsive to the passing of the circumferential zones. Means receives the signals and calculates the angular velocity of the disk responsive to the frequency of the signals, calculates the angular position of the disk in response to receiving the signal representative of a selected one of the second portion of contiguous circumferential zones, and determines the direction of rotation in response to receiving selected ones of the signals representative of the first and second portions in a preselected order.

Engine control systems are known which have a single system for sensing both speed and angle of rotation. However, the systems have heretofore employed unduly complex electronic circuitry. Moreover, none of the known systems have combined sensing speed, rotational angle and direction of rotation into a single system.

BEST MODE FOR CARRYING OUT THE INVENTION

Figure 1:
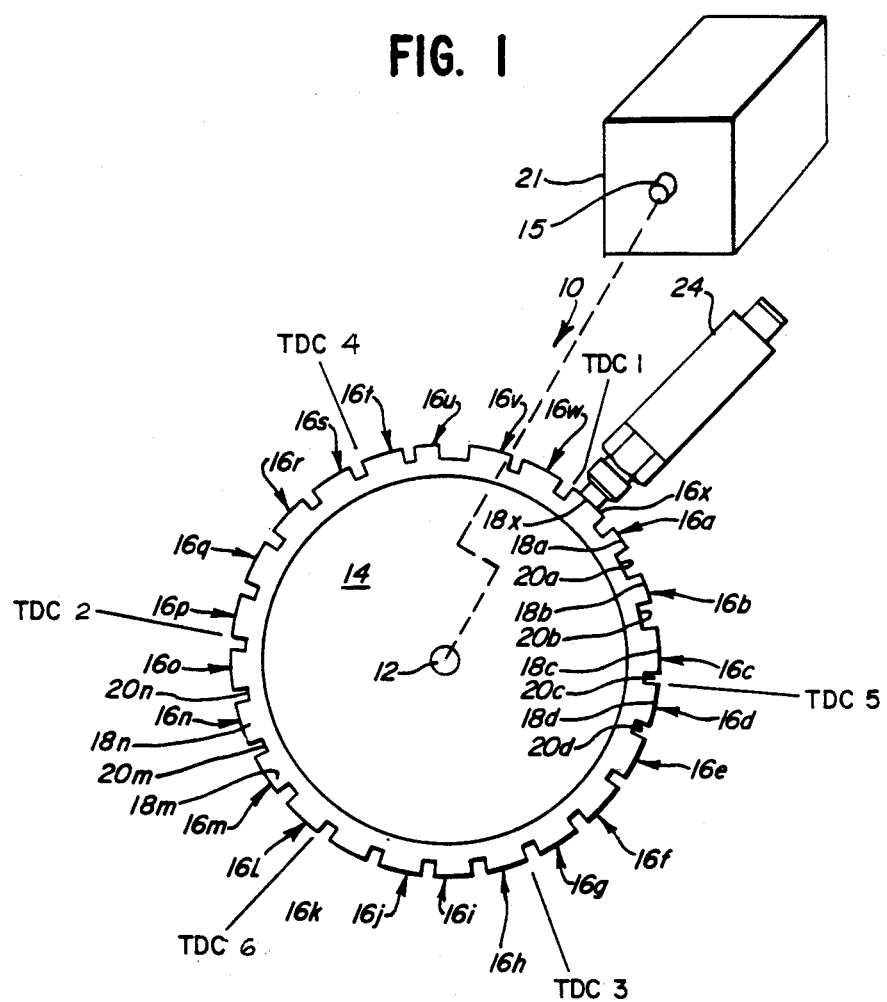
FIG. 1 schematically illustrates an embodiment of the disk element portion of the apparatus.

Referring now to the drawings wherein a preferred embodiment of the present apparatus 10 is shown, FIG. 1 illustrates the apparatus 10 which determines the speed, angular position and direction of rotation of a rotatable shaft 15. A disk in the form of a toothed wheel or gear 14 rotates in synchronism with the rotatable shaft 15 and has a plurality of contiguous circumferential zones 16a–16x of equal circumferential distance (i.e. width) or angular extent. Each of the zones 16a–16x has a first area 18a–18x positioned at a first preselected radial distance from the center of the disk 14 and a second area 20a–20x positioned at a second preselected radial distance from the center of the disk 14 different from the first radial distance. More specifically, each zone 16 includes a radially extending tooth 18 and a notch 20 each having a selected circumferential distance or angular extent. For example, the zone 16m is comprised of a tooth 18m and a notch 20m, while the zone 16n includes a tooth 18n and a notch 20n. Hence, each notch 20 is disposed between adjacent teeth 18.

The circumferential zones are divided into two zone portions, including a first portion having zones 16c–16t and 16v–16x and a second portion having zones 16a, 16b and 16u. The zones of the first portion have teeth 18c–18t, 18v–18x of equal width or angular extent. Also, the zones of the second portion have teeth 18a, 18b, 18u of equal width or angular extent different than the width of the teeth 18c–18t and 18v–18x. More specifically, the teeth 18a, 18b, 18u are of lesser width than the teeth 18c–18t, 18v–18x. Since all of the zones 16a–16x are of the same width, it follows that the notches 20a, 20b and 20u are wider than the remaining notches 20c–20t and 20v–20x.

In the preferred embodiment, the teeth 18c–18t, 18v–18x of the zones 16c–16t, 16v–16x occupy approximately 80% of the corresponding zone width, and hence, these zones have an 80% or high duty cycle. Further, the teeth 18a, 18b, 18u of the zones 16a, 16b, 16u occupy approximately 50% of the corresponding zone width, i.e. these zones have a 50% or low duty cycle. These values were not chosen at random, but were selected to take into consideration the maximum acceleration and deceleration of the disk 14 such that the apparatus 10 can distinguish between the first zone portion 16c–16t, 16v–16x and the second zone portion 16a, 16b, 16u. For example, under normal operating conditions, an internal combustion engine operates within a known envelope of performance characteristics. Maximum acceleration rates are known and are used to calculate a minimal difference between the high and low duty cycles. Should the engine experience a sudden rapid acceleration with the sensor 24 having just traversed the first tooth 18a and about to be passed by the second area 20a, then the second area 20a will appear to be a smaller percentage of the zone 16a. Rather than a 50–50 distribution, an 80–20 distribution could be detected if the engine accelerated to an average velocity of approximately four times the original velocity. Similar problems arise during deceleration.

The second zone portion 16a, 16b, 16u has a single zone 16u disposed between two zones 16t and 16v of the first zone portion which is used primarily as a base marker for determining the angle of rotation. For example, in the preferred embodiment, the disk 14 includes a shaft 12 connected to the shaft 15. The shaft 15 is, in turn, coupled to a camshaft (not shown) of a six cylinder, internal combustion engine 21 and is mechanically timed to the engine such that the piston in cylinder No. 1 of the engine reaches top dead center when the rising tooth edge of the second tooth 18x following the juncture between the zones 16u and 16v passes the sensor 24. The remaining engine pistons reach top dead center in their associated cylinders when rising tooth edges spaced at integer multiples of 60° about the disk 14 relative to the rising edge of the tooth 16x pass the sensor 24. In the case of the disk 14 having 24 zones, top dead center of a piston occurs once every four circumferential zones pass the sensor 24. Thus, the apparatus 10 can determine the angular position of the disk 14, and hence, the positions of the pistons in the cylinders, by noting the passage of the one zone 16x past the sensor 24 and counting the number of zones 16 passing the sensor 24 thereafter. Those skilled in the art will recognize that the apparatus could readily be altered for use on any multicylinder engine by altering the size and number of circumferential zones.

The second zone portion further includes adjacent zones 16a, 16b disposed between two zones 16x and 16c of the first zone portion at a preselected circumferential distance from the one zone 16u. Particularly, the zones 16a, 16b are separated from the zone 16u by three intervening first portion zones 16v–16x. The zones 16a, 16b are used in conjunction with zone 16u to determine the direction of rotation of the disk 14. In the preferred embodiment, during operation of the engine 21, the disk 14 will normally rotate in the counterclockwise direction as seen in FIG. 1.

As seen in FIG. 1, rotation of the disk 14 in the counterclockwise direction causes the sensor 24 to detect successive duty cycles of 80%–50%–80%–80%–80%–50%–50%–80% as the zones 16t–16c pass the sensor 24. That is, for example, the sensor 24 detects that the tooth 18t comprises 80% and the notch 20t comprises 20% of the width of the zone 16t and that the tooth 18u comprises 50% and the notch 20u comprises 50% of the width of the zone 16u, and so on for the remaining zones. If a viewer were inspecting the sensor output without knowing the direction of rotation of the disk 14, he would be forced to assume a direction of rotation and may select the counterclockwise direction such that the tooth 18 of each zone 16 precedes the notch 20 of that zone 16. However, if the disk were improperly rotating in the clockwise direction, the viewer would associate the tooth 18 of one zone and the notch 20 of the successive zone, that is, the notch of the zone just counterclockwise of the particular tooth 20. For example, if viewing zones 16t–16c in reverse, the viewer would actually associate tooth 18c with notch 20b, tooth 18b with notch 20a and so on. Such a misassociation would have little effect where the sharing of areas 18, 20 wee among identical zones. However, the zones 16v, 16c immediately adjacent the second portion of zones 16a, 16b, 16u will be dramatically affected. For example, the same portion of zones 16t–16c viewed in reverse will generate a pattern of varying duty cycle ratios of 62%–50%–71%–80%–80%–62%–71%–80%. The difference between the two patterns is 18%–0%–21%–0%–0%–18%–21%–0% which is a sufficient differential for the apparatus 10 to distinguish between the two patterns. Variations in engine acceleration will alter the apparatus' 10 ability to distinguish the 62% zones as a first or second portion zone. Thus, the pattern in reverse has a degree of unpredictability, but is still distinguishable from the forward pattern. A more detailed description of how the apparatus 10 discerns direction of rotation is set forth in conjunction with the flowchart of FIG. 4.

A fixed sensor 24 of the Hall effect type commonly known in the industry is disposed at a preselected radial distance from the center of the disk 14 in sensing relation to the circumferential zones 16. The sensor 24 is adapted for delivering a series of digital signals responsive to the passing of the circumferential zones 16. The passage of the teeth and notches affect the flux density sensed by the Hall effect sensor 24. Variations in flux density result in the sensor 24 delivering a time varying voltage signal with a frequency directly related to the rotational velocity of the disk element 14. Further, the duty cycle of the signal is determined by the widths of the teeth 18. Appropriate signal processing converts the analog signal to a time varying digital signal without disturbing these relationships.

Figure 2:
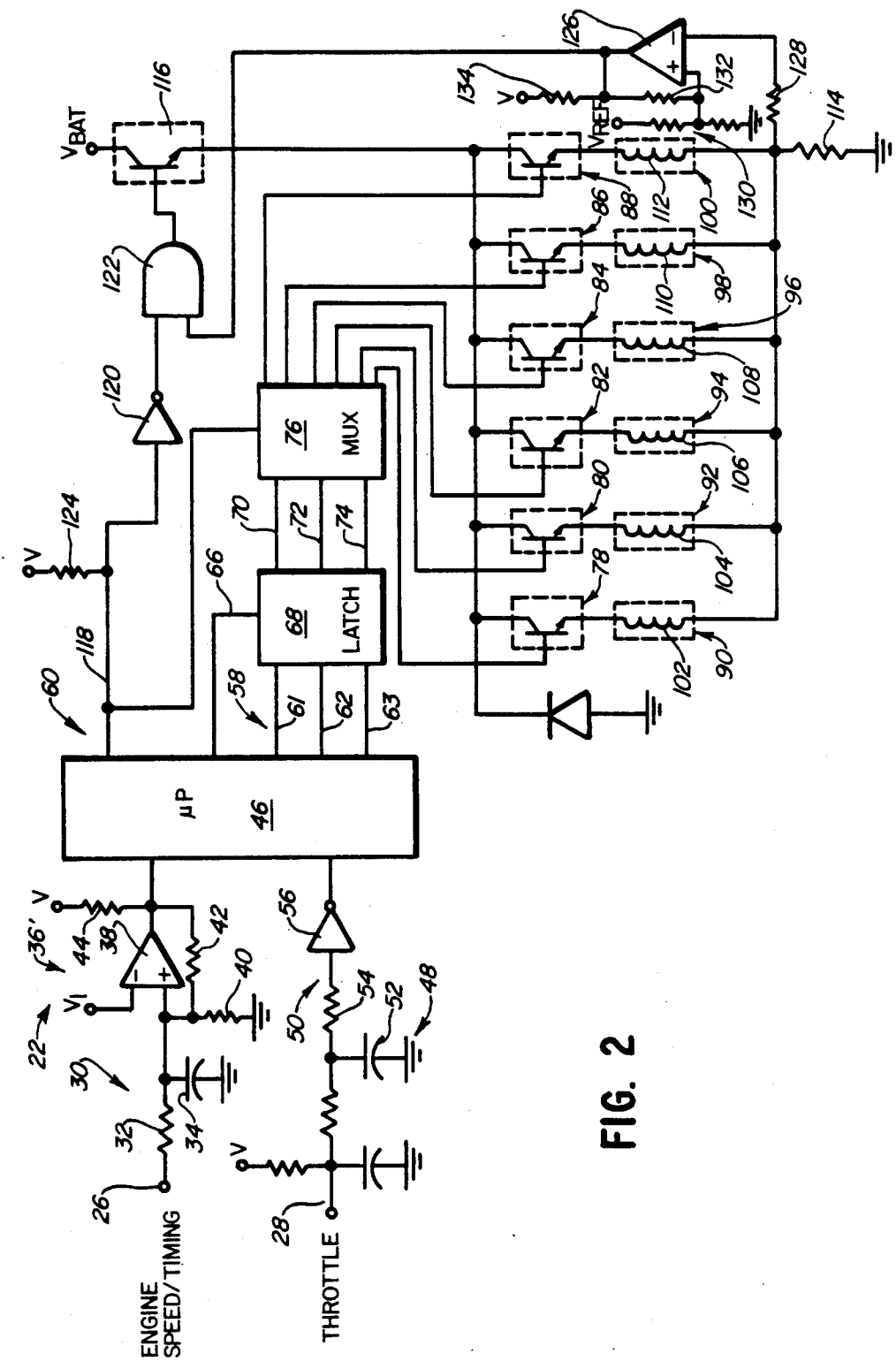
FIG. 2 illustrates an electrical schematic of an embodiment of the apparatus.

FIG. 2 illustrates an electrical schematic of a fuel injection control 22 and includes a pair of external inputs 26, 28 respectively connected to the Hall effect sensor 24 and a position sensor (not shown) operatively connected to a manual throttle control (not shown). The first input 26 is connected to a low pass filter 30 consisting of a resistor 32 and capacitor 34. The output of the filter 30 is connected to a level shifting circuit 36 which includes an operational amplifier 38. The inverting input of the amplifier 38 is connected to a reference voltage $V_1$ while the noninverting input is connected to the filter 30, system ground via a resistor 40, and its own output through a feedback resistor 42. A pull-up resistor 44 connects the output of the amplifier 38 to the desired voltage level V. The output of the amplifier 38 switches between the voltage V and the system ground as the input signal derived from the output of the sensor 24 respectively rises above and falls below the reference voltage $V_1$. Thus, the frequency and pulse width relationship remains consistent with the input signal and is delivered to a microprocessor 46.

The second input 28 is connected to the microprocessor 46 via a filter network 48. The throttle (not shown) is manually controlled in a typical manner to request a desired engine speed. A sensor (not shown) is movably connected to the throttle and, in the preferred embodiment, includes a standard potentiometer and voltage to pulse width modulation converter. The signal delivered to the input 28 is a time varying digital signal where the pulse width is directly related to throttle position. Owing to the throttle's remote location relative to the control 22, the throttle sensor is connected via a wiring harness. Such connections are inherently subject to electromagnetic interference. The filter network 48 includes a PI filter 50 specifically designed to eliminate electromagnetic interference. A capacitor 52 and inductor 54 are standard components of a PI filter with the second leg of the filter being provided by the internal capacitance of a CMOS type inverter 56.

The microprocessor 46 operates under software control to adaptively adjust the fuel injection timing and duration of each individual cylinder of a multicylinder internal combustion engine. To effect such control, the microprocessor 46 requires two sets of output signals 58, 60. A first set of signals 58 is used exclusively for selecting the individual cylinders and is transmitted over three separate data lines 61, 62, 63 and a clock line 66 connected to a latch 68. The latch 68 operates to retain the digital signals present on the data lines 61, 62, 63 when the clock signal 66 is received. These "latched" signals are delivered over three output lines 70, 72, 74 to a multiplexer 76. The multiplexer 76 has six output lines respectively connected to six power switching elements 78, 80, 82, 84, 86, 88 associated with each individual cylinder of a six cylinder engine.

Each cylinder also has a unit fuel injector 90, 92, 94, 96, 98, 100 which is operable via energization of associated electromagnetic windings 102, 104, 106, 108, 110, 112. The Windings 102, 104, 106, 108, 110, 112 are respectively connected between the power switching elements 78, 80, 82, 84, 86, 88 and through a single current sensing resistor 114 to system ground. The power switching elements 78, 80, 82, 84, 86, 88 are all connected to positive battery voltage $V_{BAT}$ through a main power switching element 116. The main power switching element 116 ultimately controls the timing and duration of energization of the unit fuel injectors 90, 92, 94, 96, 98, 100.

The second set of output signals 60 includes a single line 118 connected to a clock input of the multiplexer 76 and to the main power switching element 116 through an inverter 120 and AND gate 122. The line 118 is normally "high", owing to a pull up resistor 124; consequently, the input to the AND gate 122 is normally "low", and the switching element 116 is biased "off".

A second input to the AND gate 122 provides overcurrent protection via the current sensing resistor 114. An operational amplifier 126 has an inverting input connected through a resistor 128 to the current sensing resistor 114. A noninverting input of the operational amplifier 126 is connected to a reference voltage established by a voltage divider network 130. A feedback resistor 132 interconnects an output of the operational amplifier and its noninverting input to provide hysteresis. The output of the operational amplifier 126 is also connected to the second input of the AND gate 122 and normally held "high" by a pull up resistor 134. Thus, the output of the AND gate 122 is enabled to inversely respond to the second output 60.

During an overcurrent condition, the voltage drop across the current sensing resistor 114 exceeds the reference voltage applied to the amplifier noninverting input. The output of the operational amplifier 126 switches to a low state, in turn pulling the AND gate input "low". The power switching element 116 is biased "off" independent of the output 60.

A detailed schematic and description of the driver circuit portion of the fuel injection control 22 is found in U.S. Pat. No. 4,604,675 issued Aug. 5, 1986 to Mark K. Pflederer. The driver circuit set forth herein is a simplified version of the Pflederer circuit and is shown for illustrative purposes only. Other driver circuits could be substituted without departing from the spirit of the invention.

Figure 3:
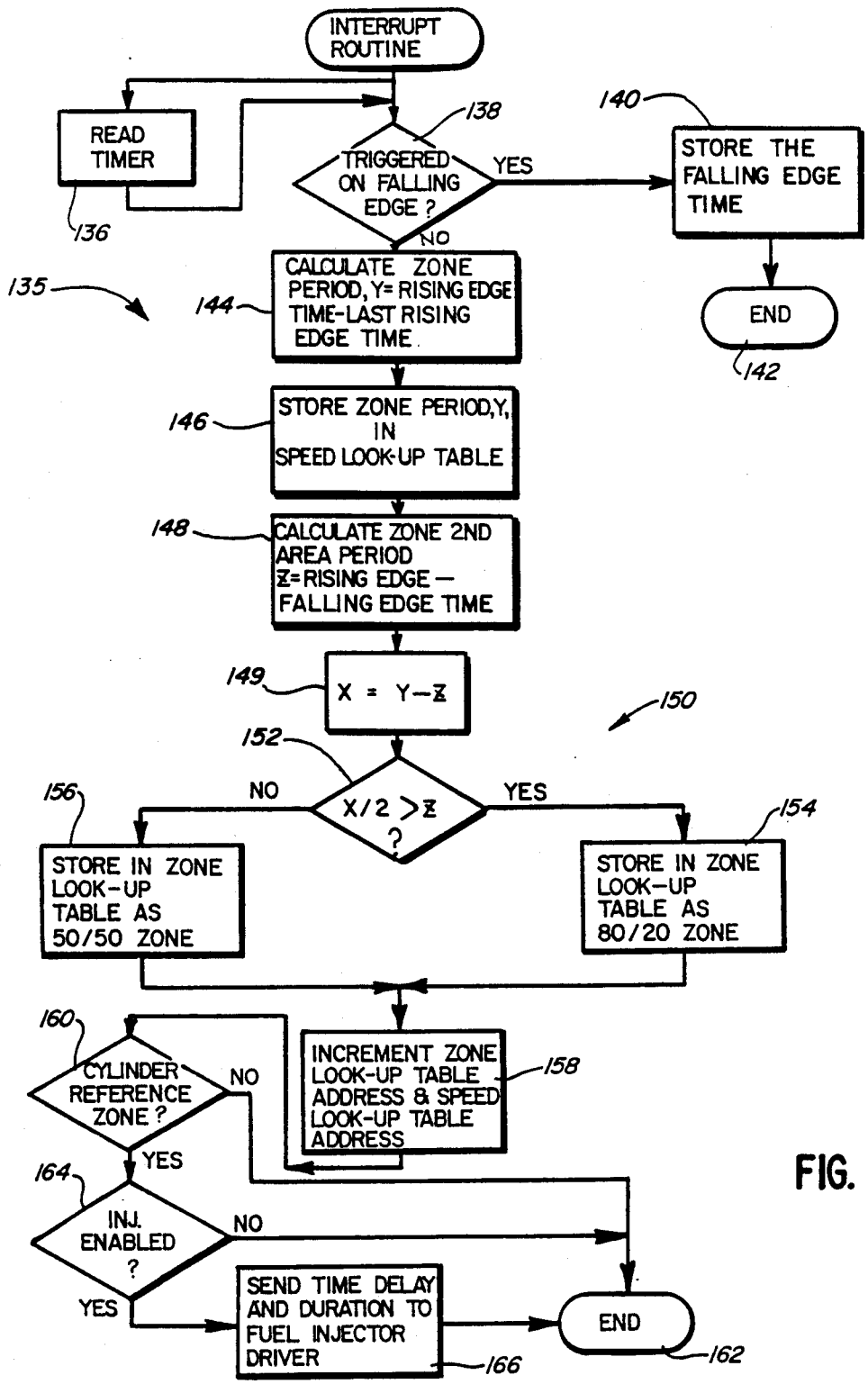
FIG. 3 illustrates a flowchart representation of an interrupt routine portion of the software used in the apparatus.
Figure 4:
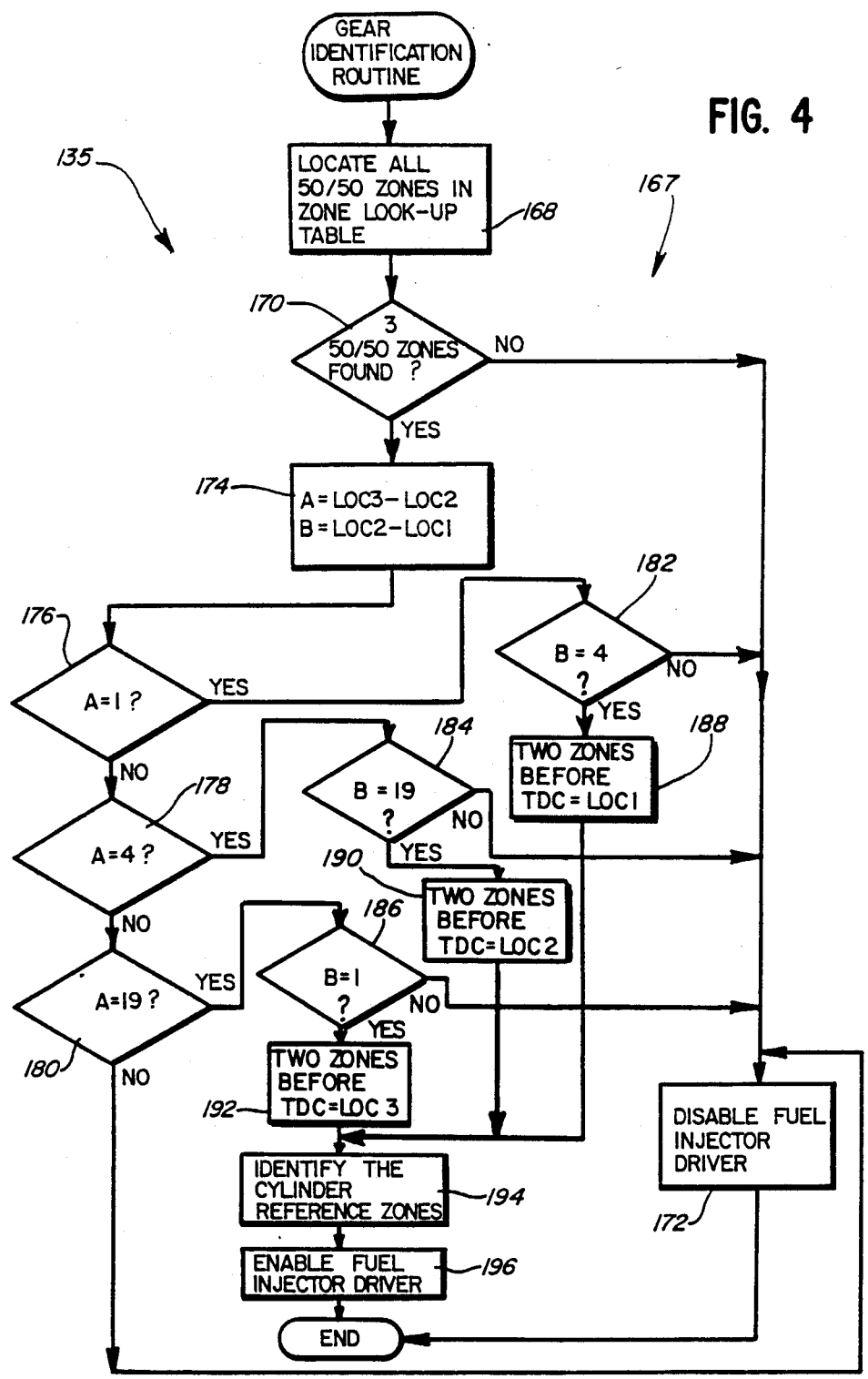
FIG. 4 illustrates a flowchart representation of a gear identification portion of the software used in the apparatus.

FIGS. 3 and 4 generally illustrate a means 135 for receiving the sensor 24 signals, calculating the angular velocity of the disk 14 responsive to the frequency of the signals, calculating the angular position of the disk 14 in response to receiving a signal representative of a selected zone 16u of the second zone portion 16a, 16b, 16u passing the sensor 24 and determining the direction of rotation of the disk 14 in response to receiving selected ones of the sensor 24 signals representative of passage of the zones of the first portion 16c-16t, 16v-16x and the zones of the second portion 16a, 16b, 16u in a preselected order.

Referring now to FIG. 3, wherein a flowchart of a portion of the software routine is illustrated, an interrupt routine is periodically called during operation of a main control routine used to govern operation of the fuel injection solenoids. Only that portion of the software necessary for determining the speed, angular position, and direction of rotation of the engine is illustrated herein. The interrupt routine is executed upon generation of each rising and falling edge of the signal developed by the sensor 24. The entire interrupt routine is executed over a 100 microsecond period which is proportionately small when compared to the minimum time required for an entire zone to traverse the sensor 24.

At the beginning of each cycle of the interrupt routine, an independent timer is read in block 136. In a decision block 138, a determination is made whether the interrupt routine was triggered by a falling or a rising edge. A falling edge trigger indicates that only the first area or tooth 18 of zone 16 has traversed the sensor 24. Therefore, a block 140 stores the timer contents as a falling edge time. Thereafter in block 142, control is returned to the main control routine.

The next trigger for the interrupt routine will necessarily be a rising edge trigger, and the block 138 will transfer control to a block 144. At this point, the entire zone has traversed the sensor 24, and a zone period Y is calculated from the most recent timer reading and the previous rising edge timer reading. The zone period Y is subsequently used to determine engine velocity and to calculate a zone first area or tooth period X. Further, the disk 14 rotates at one-half the engine velocity owing to its connection to the camshaft and must be scaled by a factor of two for an accurate representation of speed. In a block 146, the zone period Y is stored in a speed lookup table which is preferably accessed by a separate subroutine to correlate the inverse of the period Y to the actual engine speed. A plurality of torsional effects introduced by individual cylinder firings. In block 148, the zone notch period Z is calculated by subtracting the falling edge time from rising edge time. A block 149 then calculates the tooth period X by subtracting the notch period Z from the zone period Y.

The interrupt routine includes means 150 for determining the location of each of the zones of the second portion 16a, 16b, 16u. The interrupt routine differentiates between the zones of the first portion 16c–16t, 16v–16x and the zones of the second portion 16a, 16b, and 16u in a decision block 152 where one-half of the tooth period X is compared to the notch period Z. For the zones of the first portion 16c–16t, 16v–16x, one-half of the tooth period X is greater than the second area period independent of engine acceleration. This relationship does not hold true for the zones of the second portion 16a, 16b, 16u. If the zone 16 currently being identified is one of the first portion 16c–16t, 16v–16x, control transfers to a block 154 where the zone 16 is stored in the lookup table with a flag identifying it as a first portion zone. Conversely, if the zone 16 currently being identified is of the second portion 16a, 16b, 16u, control transfers to the block 156 where the zone 16 is stored in the zone lookup table with a flag identifying it as a second portion zone 16a, 16b, 16u. Control from the blocks 154 and 156 passes to a block 158 where the lookup table address is incremented in preparation of the next iteration of the interrupt routine. The next received zone 16 will be stored in the next incremental address location. Similarly, the speed lookup table address is also incremented.

In a decision block 160 the interrupt routine determines whether the timing of the engine is such that a fuel injector should be actuated. Specifically, the interrupt routine compares the current zone to the known cylinder reference zones. The cylinder reference zones are the six zones 16b, 16f, 16j, 16n, 16r and 16v which are displaced two zones from the zones 16d, 16h, 16l, 16p, 16t, 16x indicating top dead center of each of the cylinders of the internal combustion engine. The gear identification routine shown in FIG. 4 and discussed later in the specification performs the identification routine of the cylinder reference zones. If the stored zone does not correspond to a cylinder reference zone, control transfers to block 162 and returns to the main control routine without energizing a fuel injector driver. However, if the stored zone is a cylinder reference zone, then control passes to a decision block 164. In decision block 164, the routine checks to see if the injector is enabled. The main control routine can act to prevent the interrupt routine from energizing a fuel injector driver in a fail-safe condition. For example, the speed calculation routine may have detected either an engine underspeed or overspeed condition whereby continued energization of the fuel injectors is undesirable. Thus, decision block 164 can prevent continued fuel injection irrespective of engine timing. If the engine is operating within allowable parameters and the injectors are enabled, the control block 164 transfers control to block 166 where a time delay and duration signal is delivered to the fuel injector driver.

Referring now to FIG. 4, one embodiment of a gear identification routing is illustrated. The means 135 further includes a means 167 for periodically determining the location of each zone of the second portion 16a, 16b, 16u calculating the distance between the first and second sensed zone and the second and third sensed zone of the second portion 16a, 16b, 16u systematically comparing the calculated distances to a plurality of preselected distances, delivering a first rotation signal in response to the calculated distances being equivalent to at least one of the preselected distances, delivering a second rotation signal in response to the calculated distances being unequal to all of the preselected distances, delivering a signal indicative of rotation in a first direction in response to receiving the first rotation signal, and delivering a signal indicative of rotation in a second direction in response to receiving the second rotation signal.

The gear identification routine is called periodically and is used primarily to ensure that the engine is rotating in the proper direction. However, it also serves the important function of identifying the cylinder reference zones 16b, 16f, 16j, 16n, 16r and 16v to control the fuel injection timing. Beginning at a block 168, all of the second portion zones 16a, 16b, 16u are located in the zone lookup table by the flags set in block 156 of the interrupt routine. The second portion zones 16a, 16b, 16u are respectively assigned to the variables LOC1, LOC2 and LOC3 and in block 170 checked to determine that only three 50/50 second portion zones 16a, 16b, 16u have been found. For example, should the engine be rotating in the wrong direction, it is possible for the interrupt routine to identify more than three 50/50 second portion zones 16a, 16b, 16u. In that instance, the routine will immediately recognize that the engine is operating improperly and transfer control to block 172 wherein the fuel injector driver is disabled and control returns to the main control routine. However, it is also possible that only three 50/50 second portion zones 16a, 16b, 16u will be located independent of the direction of rotation, and it is therefore necessary to calculate the distance between the first LOC1 and second LOC2 received zones and the second LOC2 and third LOC3 received zones of the second portion of zones 16a, 16b, 16u and to systematically compare the calculated distances to a plurality of preselected distances whereby a first signal indicative of a proper direction of rotation is developed when the calculated distance is equal to a preselected known distance. Conversely, a second signal is developed indicative of an improper direction of rotation when the calculated distance is not equal to a known preselected distance. Specifically, the number of zones from LOC3 to LOC2 is stored as a variable A, and the number of zones from LOC2 to LOC1 is stored as a variable B. The number of zones from LOC3 to LOC2 must be 1, 4 or 19 and, if not, the engine is assumed to be rotating in the opposite direction and control transfers through the decision block 176, 178, 180 to the block 172. For example, if LOC1 corresponds to zone 16a, then LOC2 and LOC3 must respectively correspond to zones 16b and 16u, and therefor, the number of zones from LOC3 to LOC2 is 19, thereby satisfying decision block 180. Similarly, if LOC1 corresponds to the zone 16u, then LOC2 and LOC3 respectively correspond to the zones 16a, 16b. Thus, the variable A is equal to 1 satisfying decision block 176. The final possible order of reception is when LOC1 corresponds to zone 16b and locations 2 and 3 respectively correspond to zones 16u and 16a. In this instance, the variable A is equal to 4, and decision block 178 is positive.

In the event that one of the decision blocks 176, 178 and 180 is positive, control respectively transfers to decision blocks 182, 184 and 186 where a fail-safe backup check is made to confirm that the engine is rotating in the proper direction. In decision block 182, if the variable A is equal to 1, then the variable B must be equal to 4 if the engine is rotating in the proper direction. If not, control passes to the block 172, and the fuel injector driver is disabled. If B is equal to 4, the second zone in advance of the zone indicating top dead center of cylinder No. 1 is assigned the value of the variable LOC1 in block 188. Similarly, if the variable A is equal to 4, then the variable B must be equal to 19, and the second zone prior to the zone indicating top dead center of cylinder No. 1 corresponds to the value in the variable LOC2 and is assigned that value in the block 190. Once again if the variable A is equal to 19, then the variable B must also be equal to 1, and the second zone in advance of the zone designating top dead center of cylinder No. 1 is assigned the value LOC3 in block 192. Thereafter, control transfers to block 194 where the remaining cylinder reference zones are identified as the location of the two zones in advance of the zones representing top dead center of the piston in cylinder No. 1. For example, in the illustrated embodiment of a six cylinder engine where the gear 14 has 24 distinct zones 16a-16x, top dead center of each of the pistons occurs when points evenly distributed at four zone intervals pass the sensor 24. The fuel injector driver is enabled in block 196, and control is transferred to the main control routine.

It should be noted that enough zones are provided about the periphery of the disk 14 to provide adequate position sensing accuracy. However, the number of zones is kept to a minimum beyond the number required for the desired accuracy so that the time needed during each processing cycle to detect the passage of the zones is kept small relative to the processing cycle length.

Other aspects, objects and advantages of this invention can be obtained from a study of the drawings, the disclosure and the appended claims.

INDUSTRIAL APPLICABILITY

In the overall operation of the apparatus 10, assume that the internal combustion engine 21 is operating properly at a nominal speed. The speed sensor 24 reacts to the rotation of the disk 14 by delivering a time varying digital signal which has a frequency related to the disk velocity and a duty cycle dependent upon the widths of the teeth 18. The microprocessor 46 responds to the signal developed by the sensor 24 by executing the interrupt routine at each transition thereof. The interrupt routine maintains a speed look-up table by actively calculating each zone period. Further, the interrupt routine also maintains a zone look-up table by actively determining the currently received zone's status as either a first portion zone 16c-16t, 16v-16x or a second portion zone 16a, 16b, 16u.

At a considerably less frequent rate, the microprocessor 46 also executes the gear identification routine. This routine performs the dual function of identifying the direction of rotation and the location of the cylinder reference zones 16u, 16a, 16e, 16i, 16m, 16q. The routine calculates the distances between the second portion zones 16a, 16b, 16u and compares those distances to a set of known distances. Any deviation from these known distances is an indication of an improper direction of rotation. If the identification routine detects such a deviation, the engine is immediately shut down by disabling the fuel injector driver. Alternatively, a calculated distance which corresponds to one of the known set of distances also contains the base information for determining the cylinder reference zones 16u, 16a, 16e, 16i, 16m, 16q. For example, cylinder reference zones 16u and 16a are also second portion zones; thus, by matching the calculated distances to the known distances, the routine inherently knows the locations of the zones which are two zones in advance of TDC1 and TDC2. The remaining cylinder reference zones are calculated by adding multiples of four to the location of TDC1.

Once the locations of the cylinder reference zones are known, the interrupt routine can compare the zone 16 currently being evaluated to the known cylinder reference zones. A match enables the interrupt routing to deliver the time delay and duration signal to the fuel injector driver. This procedure is repeated at each rising edge of the speed and timing signal evaluating each zone individually.

We claim:

1. An apparatus (10) for determining a direction of rotation of a rotatable shaft (15), comprising:
   a disk (14) rotatable in synchronization with the rotatable shaft (15) having a plurality of contiguous zones (16a-16x), each zone having first and second areas (18a-18x, 20a-20x), wherein the zones are divided into a first set (16c-16t, 16v-16x) and a second set (16a, 16b, 16u), each of the first areas of the zones of the first set having a first angular extent and each of the first areas of the zones of the second set having a second angular extent different than the first angular extent and wherein the first and second sets of zones form a first repeating zone pattern when the disk rotates in a first direction and a second repeating zone pattern different from the first pattern when the disk rotates in a second direction opposite the first direction;
   a sensor (24) disposed adjacent the disk for developing a sensor signal in response to the passing of the zones as the disk rotates; and
   means coupled to the sensor for determining the direction of rotation of the disk in response to the sensor signal.

2. The apparatus of claim 1, wherein the disk has a center and wherein the first area of each zone terminates at a first radial distance from the center of the disk and the second area of each zone terminates at a second radial distance from the center of the disk different than the first radial distance.

3. The apparatus of claim 1, wherein the contiguous zones are of equal angular extent and wherein each first angular extent is approximately eighty percent of a corresponding zone angular extent.

4. The apparatus of claim 1, wherein the contiguous zones are of equal angular extent and wherein each second angular extent is approximately fifty percent of a corresponding zone angular extent.

5. The apparatus of claim 1, wherein there are three zones in the second set of zones and wherein one of the zones of the second set is disposed between adjacent zones of the first set and the remaining zones of the second set are disposed adjacent each other between zones of the first set.

6. The apparatus of claim 5, wherein the zones of the second set are sequentially detected by the sensor as the disk rotates and wherein the determining means includes means for calculating a first distance between a first detected zone of the second set and a second detected zone of the second set and a second distance between the second detected zone of the second set and a third detected zone of the second set, means coupled to the calculating means for comparing the calculated first distance to a plurality of predetermined distances, means for developing a first rotation signal in response to the first calculated distance being unequal to all of the predetermined distances, means operative upon determining that the first calculated distance is equal to one of the predetermined distances for comparing the second calculated distance to a selected distance and means for developing the first rotation signal in response to the second calculated distance being unequal to the selected distance and a second rotation signal in response to the second calculated distance being equal to the selected distance.

7. The apparatus of claim 1, wherein the zones are disposed about the circumference of the disk.

8. The apparatus of claim 1, wherein the disk rotates at a maximum acceleration and wherein the difference between the first and second angular extent is such that the sensor signal produced by the sensor during the passing of a zone of the first set is different than the signal produced during the passing of a zone of the second set when the disc is rotating at the maximum acceleration.

9. The apparatus of claim 1, wherein the contiguous zones are of equal angular extent and wherein each first angular extent is approximately eighty percent of a corresponding zone angular extent and each second angular extent is approximately fifty percent of a corresponding zone angular extent.

10. An apparatus (10) for determining a direction of rotation of a rotatable shaft (15), comprising:
a disk (14) rotatable in synchronization with the rotatable shaft (15) having a plurality of contiguous circumferential zones (16a–16x), each zone having a tooth (18a–18x) and a notch (20a–20x) wherein the zones are divided into a first set (16c–16t, 16v–16x) and a second set (16a, 16b, 16u), each of the teeth of the zones of the first set having a first angular extent and each of the teeth of the zones of the second set having a second angular extent different than the first angular extent and wherein the first and second sets of zones form a first repeating zone pattern when the disk rotates in a first direction and a second repeating zone pattern different from the first pattern when the disk rotates in a second direction opposite the first direction;
a sensor (24) disposed adjacent the disk for developing a sensor signal in response to the passing of the zones as the disk rotates;
first means coupled to the sensor for determining the direction of rotation of the disk in response to the sensor signal;
second means coupled to the sensor for determining the speed of rotation of the disk responsive to the sensor signal; and
third means coupled to the sensor for determining the angular position of the disk responsive to the sensor signal.

11. The apparatus of claim 10, wherein the contiguous circumferential zones are of equal angular extent and wherein each first angular extent is approximately eighty percent of a corresponding zone angular extent.

12. The apparatus of claim 10, wherein the contiguous circumferential zones are of equal angular extent and wherein each second angular extent is approximately fifty percent of a corresponding zone angular extent.

13. The apparatus of claim 10, wherein there are three zones in the second set of zones wherein the zones of the second set are sequentially detected by the sensor and wherein one of the zones of the second set is disposed between adjacent zones of the first set and the remaining zones of the second set are disposed adjacent each other between zones of the first set.

14. The apparatus of claim 13, wherein the zones of the second set are sequentially detected by the sensor as the disk rotates and wherein the first determining means includes means for calculating a first distance between a first detected zone of the second set and a second detected zone of the second set and a second distance between the second detected zone of the second and a third detected zone of the second set, means coupled to the calculating means for comparing the calculated first distance to a plurality of predetermined distances, means for developing a first rotation signal in response to the first calculated distance being unequal to all of the predetermined distances, means operative upon determining that the first calculated distance is equal to one of the predetermined distances for comparing the second calculated distance to a selected distance and means for developing the first rotation signal in response to the second calculated distance being unequal to the selected distance and a second rotation signal in response to the second calculated distance being equal to the selected distance.

15. The apparatus of claim 10, wherein the first, second and third determining means are implemented by a processor.

16. The apparatus of claim 10, wherein the disk rotates at maximum acceleration and wherein the difference between the first and second angular extents is such that the sensor signal produced by the sensor during the passing of a zone of the first set is different than the signal produced during the passing of a zone of the second set when the disk is rotating at the maximum acceleration.

17. The apparatus of claim 10, wherein the contiguous circumferential zones are of equal angular extent and wherein each first angular extent is approximately eighty percent of a corresponding zone angular extent and each second angular extent is approximately fifty percent of a corresponding zone angular extent.

* * * * *